United States Patent
Wohl, Jr. et al.

(10) Patent No.: US 11,149,165 B2
(45) Date of Patent: Oct. 19, 2021

(54) COATINGS WITH MOLECULAR FLEXIBILITY FOR ICE ADHESION MITIGATION

(71) Applicant: U.S.A. as represented by the Administrator of the National Aeronautics and Space Administration, Washington, DC (US)

(72) Inventors: Christopher J. Wohl, Jr., Portsmouth, VA (US); Joseph G. Smith, Jr., Smithfield, VA (US)

(73) Assignee: United States of America as represented by the Administrator of NASA, Washington, DC (US)

(*) Notice: Subject to any disclaimer, the term of this patent is extended or adjusted under 35 U.S.C. 154(b) by 0 days.

(21) Appl. No.: 16/538,325

(22) Filed: Aug. 12, 2019

(65) Prior Publication Data

US 2019/0367768 A1 Dec. 5, 2019

Related U.S. Application Data

(62) Division of application No. 15/254,354, filed on Sep. 1, 2016, now Pat. No. 10,377,916.

(Continued)

(51) Int. Cl.
*C09D 163/00* (2006.01)
*C08G 59/50* (2006.01)
*C08L 63/00* (2006.01)

(52) U.S. Cl.
CPC .......... *C09D 163/00* (2013.01); *C08G 59/50* (2013.01); *C08G 59/5033* (2013.01)

(58) Field of Classification Search
None
See application file for complete search history.

(56) References Cited

U.S. PATENT DOCUMENTS 3,950,451 A    4/1976 Suzuki et al.
4,451,645 A    5/1984 Johncock
(Continued)

FOREIGN PATENT DOCUMENTS

EP    0527706 A1    2/1993
EP    1166749 B1    10/2016
(Continued)

*Primary Examiner* — Rachel Kahn
*Assistant Examiner* — Ha S Nguyen
(74) *Attorney, Agent, or Firm* — Jennifer L. Riley; Robin W. Edwards; Helen M. Galus

(57) ABSTRACT

Embodiments provide ice adhesion mitigating surface coatings and methods for generating the same. Embodiments may provide anti-icing coating with at least one monomeric species exhibiting molecular flexibility. The molecular flexibility in the monomeric species may be imparted through an aliphatic or heteroaliphatic chain that may exist as a portion of the monomer backbone, as a pendant group, or as both the portion of the monomer backbone and the pendant group. In various embodiments epoxy coatings including an epoxy resin and an amine-terminated hardener may be generated. At least a portion of the amine-terminated hardener may include at least a monomeric species that exhibits molecular flexibility arising from an aliphatic chain or heteroaliphatic chain that may be within the polymer backbone and/or may persist as a pendant group.

6 Claims, 4 Drawing Sheets

Related U.S. Application Data

(60) Provisional application No. 62/212,793, filed on Sep. 1, 2015, provisional application No. 62/251,379, filed on Nov. 5, 2015.

(56) References Cited

U.S. PATENT DOCUMENTS

| | | | |
|---|---|---|---|
| 5,708,068 A | 1/1998 | Carder et al. | |
| 2012/0088040 A1* | 4/2012 | Matsumori | C08G 73/1085 428/1.26 |
| 2015/0183983 A1 | 7/2015 | Veyland et al. | |

FOREIGN PATENT DOCUMENTS

| | | | | |
|---|---|---|---|---|
| GB | 1141206 A | * | 1/1969 | C08G 59/54 |
| GB | 2476841 A | | 7/2011 | |

* cited by examiner

R = CH₂(CH₂)₅CH₃, CH₂CH₂OCH₃, or
(CH₂)₂O(CH₂)₂OCH₃

COATINGS WITH MOLECULAR FLEXIBILITY FOR ICE ADHESION MITIGATION

CROSS-REFERENCE TO RELATED APPLICATIONS

This patent application is a divisional of and claims the benefit of and priority to U.S. Non-Provisional patent application Ser. No. 15/254,354, filed on Sep. 1, 2016 which claims the benefit of and priority to both U.S. Provisional Patent Application No. 62/212,793 titled "Coatings with Molecular Flexibility for Ice Adhesion Mitigation" filed Sep. 1, 2015, and U.S. Provisional Patent Application No. 62/251,379 titled "Coatings with Molecular Flexibility for Ice Adhesion Mitigation" filed Nov. 5, 2015, the contents of which are hereby incorporated by reference in their entireties.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Surface contamination arising from environmental factors, such as insects, particulates, ice accretion, etc., can adversely influence the efficiency and performance of structures, such as aerospace structures (e.g., aircraft wings, propeller blades, etc.), wind turbine blades, or other type structures. In some cases, surface contamination can have catastrophic consequences. Icing of surfaces, in particular, can dramatically change the weight, drag characteristics, and uniformity of airfoils which, when not properly corrected, can lead to loss of handling, equipment, and lives. Although accretion of ice on wind turbines used for energy generation has deleterious results on energy harvesting efficiency, icing events generally only occur during cold weather. For aircraft, however, in-flight icing can occur year round depending on environmental factors.

Prevention of ice accretion on aircraft surfaces is currently performed using so-called "active strategies," that is, strategies that require the input of external energy. The main technologies that are utilized are heated surfaces and pneumatic boots. Although these approaches are effective, they require energy, increase manufacturing and maintenance complexity, and add weight to the aircraft. Thus, alternative techniques to mitigate in-flight icing are sought.

BRIEF SUMMARY OF THE INVENTION

Various embodiments provide ice adhesion mitigating surface coatings and methods for generating the same. Various embodiments may provide anti-icing coating(s) with at least one monomeric species exhibiting molecular flexibility. The molecular flexibility in the monomeric species may be imparted through an aliphatic or heteroaliphatic chain that may exist as a portion of the monomer backbone, as a pendant group, or as both the portion of the monomer backbone and the pendant group. In various embodiments, epoxy coatings, including an epoxy resin and an amine-terminated hardener, may be generated. In various embodiments, at least a portion of the amine-terminated hardener may include at least one monomeric species that exhibits molecular flexibility arising from an aliphatic chain or a heteroapliphatic chain that may be either within the polymer backbone, may persist as a pendant group, or may be both within the polymer backbone and the pendant group. In various embodiments, the molecular flexibility of the monomer may reduce the interaction energy and, ultimately, the ice adhesion strength of ice accreted on the surface through the impact of fluid, such as super-cooled water droplets.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
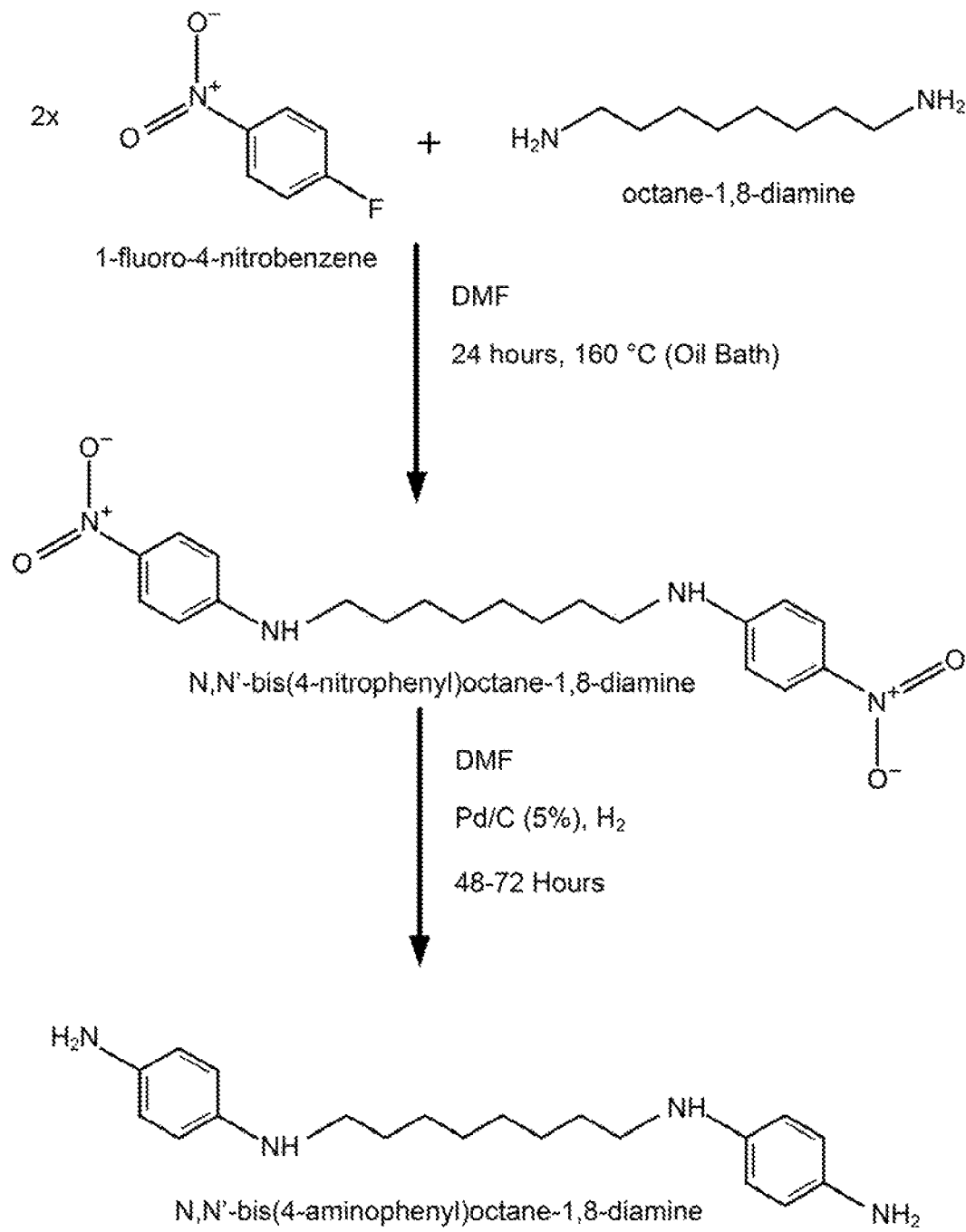
FIGS. 1-3 illustrate steps in the synthesis of various embodiment monomers.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

One approach to providing alternative techniques to mitigate in-flight icing may be to utilize "passive strategies," which are strategies that do not require the input of energy. Passive strategies can be used as the sole source of anti-icing properties or can be used in combination with active strategies in such a manner that reduces the active strategy energy requirements. To this end, a variety of different materials and coatings have been generated and evaluated for their anti-icing properties. Summarizing these results, it is apparent that both surface chemical composition and topography play a role in ice adhesion strength. The biggest shortcoming of technologies that have shown promise for ice adhesion prevention is a lack of the necessary durability to persist as an anti-icing surface long enough to meet the needs of the aviation industry. Likewise, the scalability to a commercial setting of many of the coatings that have been evaluated is lacking.

Various embodiments provide ice adhesion mitigating surface coatings and methods for generating the same. Various embodiments may provide anti-icing coating with at least one monomeric species exhibiting molecular flexibility. The molecular flexibility in the monomeric species may be imparted through an aliphatic or heteroaliphatic chain that may exist as a portion of the monomer backbone, as a pendant group, or as both the portion of the monomer backbone and the pendant group. In various embodiments, epoxy coatings including an epoxy resin and an amine-terminated hardener may be generated. In various embodiments, at least a portion of the amine-terminated hardener may include at least a monomeric species that exhibits molecular flexibility arising from an aliphatic or heteroaliphatic chain that may be either within the polymer backbone and/or may persist as one or more pendant groups. In various embodiments, the amine-terminated hardener may include a monomeric species that exhibits molecular flexibility arising from an aliphatic or heteroaliphatic chain that may be either within the polymer backbone and/or may persist as one or more pendant groups. In various embodiments, the amine-terminated hardener may include multiple monomeric species, one or more of which may exhibit molecular flexibility arising from an aliphatic or heteroaliphatic chain that may be either within the polymer backbone and/or may persist as one or more pendant groups. For example, a first portion of the amine-terminated hardener may include one or more monomeric species that exhibits molecular flexibility and a second portion of the amine-terminated hardener may include one or more monomeric species that may not exhibit molecular flexibility. In various embodiments, when the aliphatic or heteroaliphatic chain is a pendant group, the one or more pendant groups may originate from a single aromatic ring or a polycyclic aromatic (i.e. fluorene) base structure. In various embodiments, the molecular flexibility of the monomer may reduce the interaction energy and, ultimately, the ice adhesion strength of ice accreted on the surface through the impact of fluid, such as super-cooled water droplets. The various embodiment anti-icing coatings may be deposited on a metal layer, such as an aluminum layer, to form an ice adhesion mitigating surface. As examples, the anti-icing coatings may be deposited on metal surfaces of aircraft wings, propellers, or other aircraft surfaces, marine surfaces, wind-turbine blades, etc., to give the metal surfaces ice adhesion mitigation properties. In this manner, the various embodiments may offer a "passive" alternative (and/or supplement) to current "active strategies," for ice mitigation.

The various embodiments may provide anti-icing coatings. The embodiment materials may be icephobic, i.e., exhibit reduced ice adhesion interactions, as a result of the molecular flexibility imbued in the embodiment anti-icing coatings by the presence of aliphatic or heteroaliphatic chains that may be either within the polymer backbone and/or may be pendant groups. The various embodiment anti-icing coatings may be generated from a two-part epoxy including an epoxy resin and an amine-terminated hardener. At least a portion of the amine-terminated hardener may include at least a monomeric species that exhibits molecular flexibility arising from an aliphatic or heteroaliphatic chain that may be either within the polymer backbone and/or that may persist as a pendant group. The location of the aliphatic or heteroaliphatic chain, either within the polymer backbone and/or as a pendent group, may be determined based on whether the monomer consists of a single or multiple benzene rings. If the monomer is a single benzene ring or polycyclic aromatic hydrocarbon or heterocyclic species, then the aliphatic or heteroaliphatic chain may exist as a pendant group. If the monomer contains multiple benzene rings or polycyclic aromatic hydrocarbons or heterocyclic species, then the aliphatic or heteroaliphatic chain may either exist as a pendant group, as a portion of the polymer backbone, or both. For example, in various embodiments, the amine-terminated hardener may include a two di-substituted benzene rings connected by an aliphatic or heteroaliphatic chain. The aliphatic or heteroaliphatic chain may be various lengths, such as 1 atom long, 2 atoms long, 4 atoms long, 12 atoms long, 20 atoms long, 25 atoms long, greater than 25 atoms long, approximately 1 to 25 atoms long, approximately 2-20 atoms long, approximately 4-12 atoms long, etc. Preferably the aliphatic or heteroaliphatic chain may be 2-20 atoms long and most preferably the aliphatic or heteroaliphatic chain may be 4-12 atoms long. In the various embodiments, the epoxy resin may be formed from a combination of the epoxy resin D.E.R. 331 from Dow and a polyethylene glycol epoxy resin from Sigma Aldrich combined at a 1:1 ratio.

Figure 2:
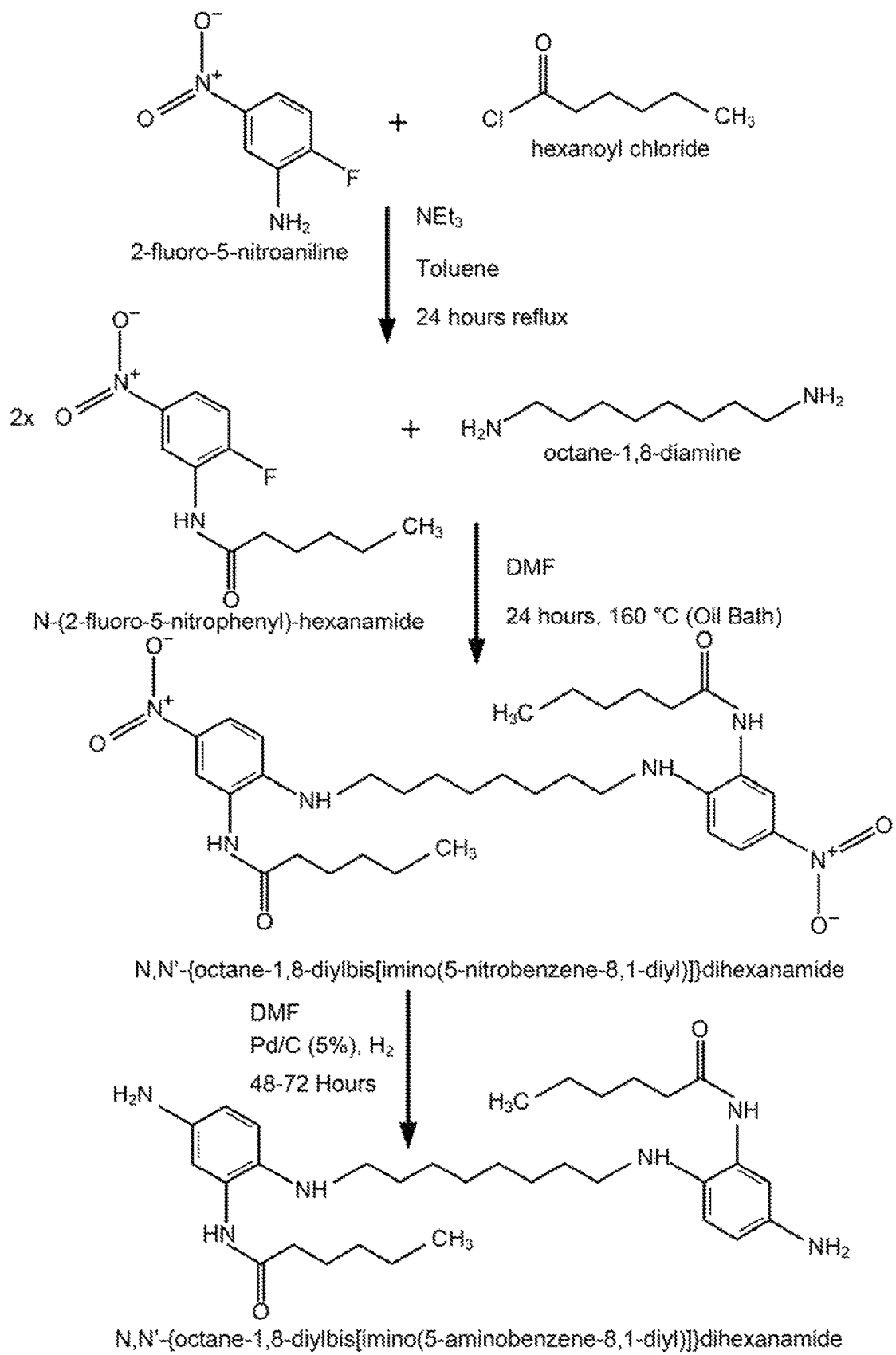
Figure 3:
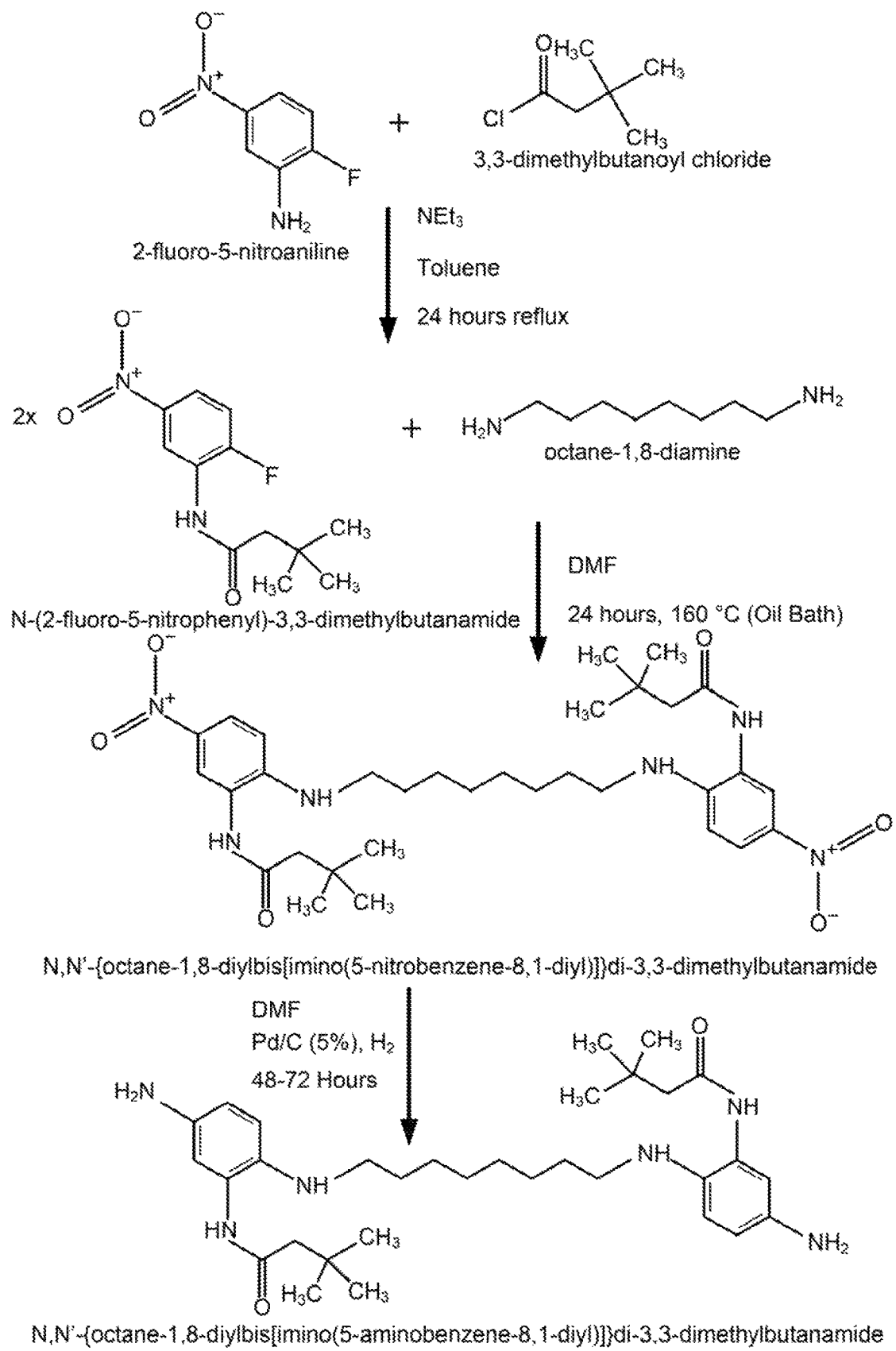

FIGS. 1, 2, and 3 illustrate examples of approaches for synthesis of embodiment monomeric species that may be generated with the aliphatic chain in the polymer backbone. Similar methodologies may be utilized to generate the pendant group monomers according to the various embodiments. Alternatively, different synthetic schemes may be employed to generate the embodiment monomeric species with the aliphatic chain in the polymer backbone and/or the pendent group monomers according to the various embodiments.

FIG. 1 illustrates the synthesis of N,N'-bis(4-aminophenyl)octane-1,8-diamine according to an embodiment. In a first step, twice an amount of 1-fluoro-4-nitrobenzene and an amount of octane-1,8-diamine may be combined together in a solution of dimethylformamide (DMF) and heated in a 160° C. oil bath for 24 hours to form N,N'-bis(4-nitrophenyl)octane-1,8-diamine. In a second step, the N,N'-bis(4-nitrophenyl)octane-1,8-diamine may be combined with a solution of DMF, palladium on carbon (Pd/C) at 5% loading, and hydrogen ($H_2$) for 48 to 72 hours to reduce the N,N'-bis(4-nitrophenyl)octane-1,8-diamine to form N,N'-bis(4-aminophenyl)octane-1,8-diamine. In various embodiments, the N,N'-bis(4-aminophenyl)octane-1,8-diamine may be a monomer of an amine-terminated hardener, and the amine-terminated hardener may be combined with an epoxy resin (e.g., an epoxy resin formed from equal parts epoxy resin D.E.R. 331 from Dow and a polyethylene glycol epoxy resin from Sigma Aldrich) to form an anti-icing coating. As discussed further below, such an embodiment anti-icing coating was synthesized and experiments were conducted with the embodiment anti-icing coating. For ease of reference, in relation to the results of these experiments, such an embodiment anti-icing coating is referenced herein by the label "CM-2."

FIG. 2 illustrates the synthesis of N,N'-{octane-1,8-diyl-bis[imino(5-aminobenzene-8,1-diyl)]}dihexanamide according to an embodiment. In a first step, 2-fluoro-5-nitroaniline and hexanoyl chloride may be combined in a mixture of triethylamine ($NEt_3$), toluene, and reflux distillation may be performed for 24 hours to form N-(2-fluoro-5-nitrophenyl)-hexanamide. In a second step, twice an amount of N-(2-fluoro-5-nitrophenyl)-hexanamide and an amount of octane-1,8-diamine may be combined together in a solution of DMF and heated in a 160° C. oil bath for 24 hours to form N,N'-{octane-1,8-diylbis[imino(5-nitrobenzene-8,1-diyl)]}dihexanamide. In a third step, the N,N'-{octane-1,8-diylbis[imino(5-nitrobenzene-8,1-diyl)]}dihexanamide may be combined with a solution of DMF, Pd/C at 5% loading, and $H_2$ for 48 to 72 hours to reduce the N,N'-{octane-1,8-diylbis[imino(5-nitrobenzene-8,1-diyl)]}dihexanamide to form N,N'-{octane-1,8-diylbis[imino(5-aminobenzene-8,1-diyl)]}dihexanamide. In various embodiments, the N,N'-{octane-1,8-diylbis[imino(5-aminobenzene-8,1-diyl)]}dihexanamide may be a monomer of an amine-terminated hardener, and the amine-terminated hardener may be combined with an epoxy resin (e.g., an epoxy resin formed from equal parts epoxy resin D.E.R. 331 from Dow and a polyethylene glycol epoxy resin from Sigma Aldrich) to form an anti-icing coating. As discussed further below, such an embodiment anti-icing coating was synthesized and experiments were conducted with the embodiment anti-icing coating. For ease of reference, in relation to the results of these experiments, such an embodiment anti-icing coating is referenced herein by the label "RMI-3."

FIG. 3 illustrates the synthesis of N,N'-{octane-1,8-diyl-bis[imino(5-aminobenzene-8,1-diyl)]}di-3,3-dimethylbutanamide according to an embodiment. In a first step, 2-fluoro-5-nitroaniline and 3,3-dimethylbutanoyl chloride may be combined in a mixture of $NEt_3$, toluene, and reflux distillation may be performed for 24 hours to form N-(2-fluoro-5-nitrophenyl)-3,3-dimethylbutanamide. In a second step, twice an amount of N-(2-fluoro-5-nitrophenyl)-3,3-dimethylbutanamide and an amount of octane-1,8-diamine may be combined together in a solution of DMF and heated in a 160° C. oil bath for 24 hours to form N,N'-{octane-1,8-diylbis[imino(5-nitrobenzene-8,1-diyl)]}di-3,3-dimethylbutanamide. In a third step, the N,N'-{octane-1,8-diylbis[imino(5-nitrobenzene-8,1-diyl)]}di-3,3-dimethylbutanamide may be combined with a solution of DMF, Pd/C at 5% loading, and $H_2$ for 48 to 72 hours to reduce the N,N'-{octane-1,8-diylbis[imino(5-nitrobenzene-8,1-diyl)]}di-3,3-dimethylbutanamide to form N,N'-{octane-1,8-diylbis[imino(5-aminobenzene-8,1-diyl)]}di-3,3-dimethylbutanamide. In various embodiments, the N,N'-{octane-1,8-diylbis[imino(5-aminobenzene-8,1-diyl)]}di-3,3-dimethylbutanamide may be a monomer of an amine-terminated hardener, and the amine-terminated hardener may be combined with an epoxy resin (e.g., an epoxy resin formed from equal parts epoxy resin D.E.R. 331 from Dow and a polyethylene glycol epoxy resin from Sigma Aldrich) to form an anti-icing coating. As discussed further below, such an embodiment anti-icing coating was synthesized and experiments were conducted with the embodiment anti-icing coating. For ease of reference, in relation to the results of these experiments, such an embodiment anti-icing coating is referenced herein by the label "RM2-3."

Figure 4:
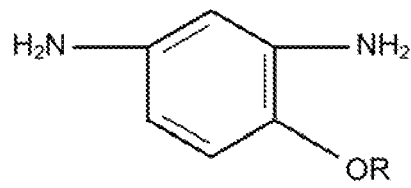
FIG. 4 illustrates the structure of pendant group monomers including a single ring that may exhibit molecular flexibility arising from the pendant aliphatic chain according to the various embodiments.

FIG. 4 illustrates the structure of pendant group monomers including a single ring that may exhibit molecular flexibility arising from the pendant aliphatic chain according to the various embodiments. The various embodiment pendant group monomers may be derived from a meta-phenylenediamine (MPDA) core each having a pendant chain —OR, where R is $CH_2(CH_2)_5CH_3$, $CH_2CH_2OCH_3$, or $(CH_2)_2O(CH_2)_2OCH_3$. The synthesis of the materials illustrated in FIG. 4 may differ from the materials illustrated in FIGS. 1-3. The various embodiment pendant group monomers illustrated in FIG. 4 may be synthesized from a chlorinated dinitrobenzene ring that may be reacted with a substituted alcohol. The product of that reaction may then be reduced to the diamine. In various embodiments, the pendant group monomers may be monomers of amine-terminated hardeners, and the amine-terminated hardeners may be combined with an epoxy resin (e.g., an epoxy resin formed from equal parts epoxy resin D.E.R. 331 from Dow and a polyethylene glycol epoxy resin from Sigma Aldrich) to form various anti-icing coatings. As discussed further below, such an embodiment anti-icing coating where R is $CH_2(CH_2)_5CH_3$ was synthesized and experiments were conducted with the embodiment anti-icing coating. For ease of reference, in relation to the results of these experiments, such an embodiment anti-icing coating where R is $CH_2(CH_2)_5CH_3$ is referenced herein by the label "MPDA-C7." As discussed further below, such an embodiment anti-icing coating where R is $CH_2CH_2OCH_3$ was synthesized and experiments were conducted with the embodiment anti-icing coating. For ease of reference, in relation to the results of these experiments, such an embodiment anti-icing coating where R is $CH_2CH_2OCH_3$ is referenced herein by the label "MPDA-OEtOMe." As discussed further below, such an embodiment anti-icing coating where R is $(CH_2)_2O(CH_2)_2OCH_3$ was synthesized and experiments were conducted with the embodiment anti-icing coating. For ease of reference, in relation to the results of these experiments, such an embodiment anti-icing coating where R is $(CH_2)_2O(CH_2)_2OCH_3$ is referenced herein by the label "MPDA-(OEt)2OMe."

Figure 5:
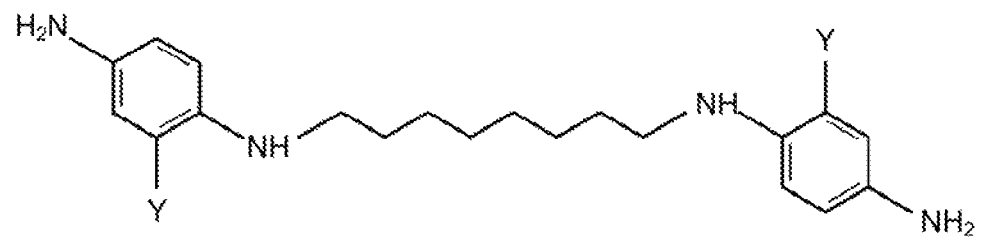
FIG. 5 illustrates the structure of various embodiment monomeric species exhibiting molecular flexibility.
Figure 5:
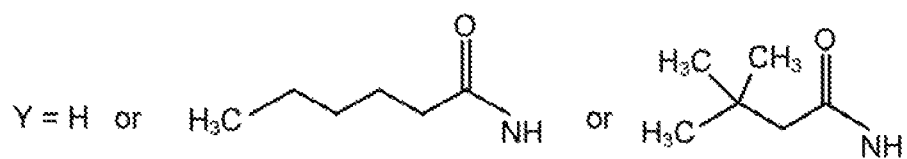

FIG. 5 illustrates the structure of various embodiment monomeric species exhibiting molecular flexibility. In various embodiments, amine-terminated hardeners may include two di-substituted benzene rings connected by an aliphatic chain or heteroaliphatic chain as illustrated in FIG. 5. The aliphatic chain or heteroaliphatic chain may be various lengths, such as 1 atom long, 2 atoms long, 4 atoms long, 12 atoms long, 20 atoms long, 25 atoms long, greater than 25 atoms long, approximately 1 to 25 atoms long, approximately 2-20 atoms long, approximately 4-12 atoms long, etc. Preferably the aliphatic or heteroaliphatic chain may be 2-20 atoms long and most preferably the aliphatic or heteroaliphatic chain may be 4-12 atoms long. The amine-terminated hardeners may include monomeric species exhibiting molecular flexibility with structures illustrated in FIG. 5. The amine-terminated hardeners may include monomeric species exhibiting molecular flexibility which may be N,N'-bis(4-aminophenyl)octane-1,8-diamine cores having pendant chains Y, where Y is H,

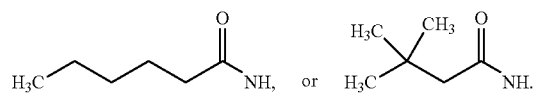

The various synthetic schemes discussed above are merely used as examples to better illustrate aspects of the various embodiment monomers and are not intended to limit the scope of the various embodiment in any way. Other synthetic schemes may be used to generate the various embodiment monomers, and other synthetic schemes may be substituted in the various examples without departing from the scope of the various embodiments.

Synthesis of the embodiment monomers described above was conducted and ice adhesion testing of these materials was conducted. By comparison of the ice adhesion strengths of the embodiment designed monomers to a control species of merely an epoxy resin formed from a combination of the epoxy resin D.E.R. 331 from Dow and a polyethylene glycol epoxy resin from Sigma Aldrich combined at a 1:1 ratio, and meta-phenylenediamine (referred to herein by the label "MPDA"), the ice adhesion strength was observed to be reduced for the embodiment designed monomers. This reduction in ice adhesion strength for the embodiment designed monomers may be directly attributed to the presence of the aliphatic chains on the amine-terminated hardener.

Experiments were conducted in Pennsylvania State University's Adverse Environment Rotor Test Stand (AERTS) at −8° C., −12° C., and −16° C. within the Federal Aviation Regulations (FAR) Part 25/29 Appendix C icing envelope. Ice adhesion shear strength (IASS) was determined on aluminum panels (measuring 10.16 cm by 15.24 cm). A control panel of pristine uncoated aluminum was compared to aluminum panels coated with epoxy resins discussed above, i.e., MPDA, MPDA-(OEt)2OMe, MPDA-OEtOMe, MPDA-C7, RM2-3, RM1-3, and CM-2. The rotor of the AERTS was operated at 400 rpm and an icing cloud density (i.e., liquid water content of 1.9 g/m$^3$ with a water droplet mean volumetric diameter of 20 microns. The results of the IASS experiments are shown in Table 1 ("ND" stands for "Not Determined" in Table 1).

TABLE 1

| Surface | IASS at −8° C. kPA | Std Dev, kPA | IASS at −12° C. kPA | Std Dev, kPA | IASS at −16° C. kPA | Std Dev, kPA |
| --- | --- | --- | --- | --- | --- | --- |
| Aluminum Control | 64.60 | 16.55 | 97.56 | 5.79 | 149.41 | 11.86 |
| MPDA | 77.84 | 18.34 | 187.68 | 15.10 | 330.47 | 42.95 |
| MPDA-OEtOMe | 69.77 | 15.79 | 139.00 | 13.65 | 175.82 | 19.31 |
| MPDA-(OEt)2OMe | 73.29 | 3.17 | 116.11 | 14.82 | 273.31 | 12.76 |
| MPDA-C7 | 46.88 | 10.82 | 91.70 | 13.24 | 121.25 | 12.41 |
| CM-2 | 34.40 | 1.72 | 51.85 | 6.41 | 65.50 | 10.62 |
| RM1-3 | ND | ND | ND | ND | 208.84 | 52.74 |
| RM2-3 | 46.33 | 5.31 | 70.88 | 9.65 | 105.97 | 17.03 |

To compare the anti-icing coating's performance, an adhesion reduction factor (ARF) was calculated for selected surfaces according to the equation:

ARF=(IASS of Aluminum Control)/(IASS of selected surface)

An ARF of greater than 1 indicated that the coating on the selected surface caused ice to not adhere as well as ice would have to the uncoated aluminum surface, thereby indicating improved anti-icing performance. An ARF of less than 1 indicated that the coating on the selected surface caused more ice to adhere than would have adhered to the uncoated aluminum surface. Table 2 shows the ARF for the various anti-icing coating coated surfaces ("ND" stands for "Not Determined" in Table 2).

TABLE 2

| Surface | ARF | | |
| --- | --- | --- | --- |
|  | −8° C. | −12° C. | −16° C. |
| Aluminum Control | 1.00 | 1.00 | 1.00 |
| MPDA | 0.83 | 0.52 | 0.45 |
| MPDA-OEtOMe | 0.93 | 0.70 | 0.85 |
| MPDA-(OEt)2OMe | 0.88 | 0.84 | 0.55 |

TABLE 2-continued

| Surface | ARF | | |
| --- | --- | --- | --- |
|  | −8° C. | −12° C. | −16° C. |
| MPDA-C7 | 1.38 | 1.06 | 1.23 |
| CM-2 | 1.88 | 1.88 | 2.28 |
| RM1-3 | ND | ND | 0.72 |
| RM2-3 | 1.39 | 1.38 | 1.41 |

Compared to an aluminum alloy surface, one of the best performing embodiment coatings with in-chain molecular flexibility (CM-2) exhibited an approximately 56% reduction in ice adhesion strength at −16° C. This same coating exhibited an approximately 80% reduction in ice adhesion strength at −16° C. compared to the rigid epoxy control (MPDA). Similarly, one of the best performing coatings with pendant group molecular flexibility (MPDA-C7) exhibited an approximately 19% reduction and an approximately 63% reduction in ice adhesion strength at −16° C. compared to the aluminum alloy surface and the rigid epoxy control (MPDA), respectively. The data already collected demonstrates the efficacy of introducing this molecular flexibility whether it is in the polymer backbone or exists as a pendant group. A reduction in ice adhesion strength, relative to a bare metal surface, of greater than 50% may lead to decreased energy requirements for the active ice mitigation strategies currently used on aircraft or a removal of these active systems altogether on future aircraft. Additionally, the various embodiments may be of interest to the ship builders to prevent icing on sea vessels, as well as power system providers for prevention of icing on electrical lines and/or wind turbine blades.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. An anti-icing coating, comprising:
   an epoxy resin;
   an amine-terminated hardener exhibiting molecular flexibility,
   wherein the amine-terminated hardener comprises:

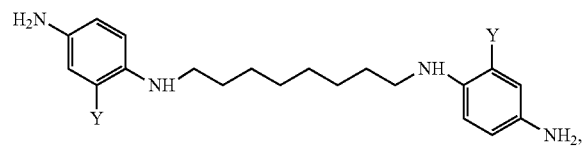

and wherein Y is H,

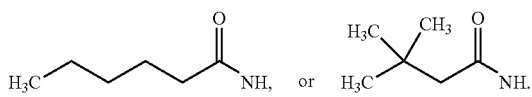

2. The anti-icing coating of claim 1, wherein Y is H.
3. The anti-icing coating of claim 1, wherein Y is

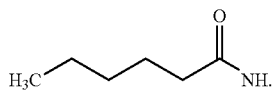

4. The anti-icing coating of claim 1, wherein Y is

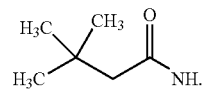

5. A method for forming an anti-icing coating, comprising:
   providing an epoxy resin;
   providing an amine-terminated hardener exhibiting molecular flexibility; and
   combining the epoxy resin and the amine-terminated hardener,
   wherein the amine-terminated hardener comprises:

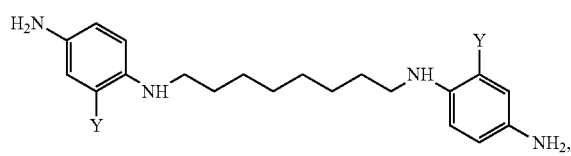

and wherein Y is H,

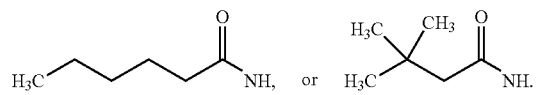

6. A surface, comprising:
   a metal layer; and
   an anti-icing coating deposited on the metal layer, the anti-icing coating comprising:
      an epoxy resin; and
      an amine-terminated hardener exhibiting molecular flexibility,
   wherein the amine-terminated hardener comprises:

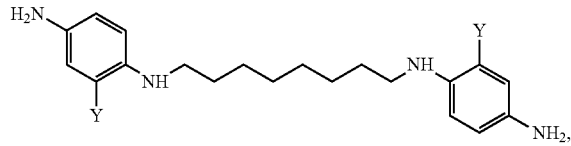

and wherein Y is H,

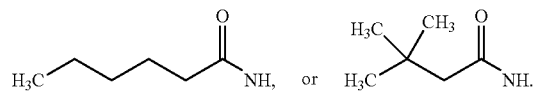

* * * * *